United States Patent Office 2,745,769
Patented May 15, 1956

2,745,769

WELDING FLUX AND METHOD

George Edwin Linnert and Walter R. Satterfield, Baltimore, Md., assignors to Armco Steel Corporation, a corporation of Ohio No Drawing. Application November 5, 1952,
Serial No. 318,964

13 Claims. (Cl. 117—132)

Our invention relates generally to fusion-welding high alloy metals, and particularly concerns both a flux which is suited for high speed welding of such alloy metals in machinery which is either wholly or partly automatic, and a method of welding employing such flux, as well as to the products to be welded, to which the flux is preliminarily applied.

An object of our invention is to provide a flux well-suited for high speed welding in automatic machinery, which flux in itself is easy to handle and cheaply produced from available materials, and which in use will tenaciously cling to the metal under the wash and scour of the gases employed, which flux will condition the refractory oxide normally forming thereon and flux the same, permitting observation by the operator of sweating of the underlying metal and determination of the most suitable moment for application of the metal to be welded thereto.

Another object of our invention is to provide a method of fusion-welding high alloy steels high in both chromium and manganese and wherein we employ the flux just hereinbefore referred to, which method is rapid, certain and predictable in results, achieving effective strong and tenacious union between the metals undergoing welding, and which is particularly adapted to high speed welding in automatic machinery where a number of like welding operations are being simultaneously conducted with sureness and minimum shut-down.

A still further object is the provision of high alloy steel products according to the foregoing fluxing wherein products with a tough, tenacious flux film are had for further deposit welding in a multi-weld operation in automatic machinery with rapid welding under required high temperature conditions, without burning or other damage to the metal.

All the foregoing as well as many other highly practical objects and advantages attend upon the practice of our invention, and these in part will be obvious and in part more fully pointed out during the course of the following specification.

It becomes evident from the foregoing that our invention resides in the several component ingredients, compositions of matter, and mixture of materials; and in the various manipulative and procedural steps employed wherein compounds are used; and in the products resulting from the employment of such compounds and manipulative steps, the scope of the application of all of which is more fully set forth in the claims at the end of this specification.

Accordingly, and as conducive to a more ready and thorough understanding of our invention, it may be noted at this point that many expensive alloys are used in present-day applications, where advantageous use is made of their stainless qualities and their high resistance to heat, or both. However, these alloys are costly, due in large measure both to the cost of the alloying ingredients employed as well as to the manufacturing and manipulative steps required in their production. Accordingly, it has become common practice to employ such alloys only at those regions where attack from either corrosion or heat, or a combination thereof, is to be expected. This limited use of the metal is effected by welding facings or strips of the high alloy metal at the critical points, to the base metal from which the fabricated article is largely constructed.

Illustratively, and considering the case of internal combustion engine exhaust valves, here the valve itself is fashioned of stainless steel, itself of high quality, while a strip of higher alloy metal possessing requisite high temperature characteristics is welded thereon in the region where a particular valve seals against the corresponding valve seat. The problems encountered in the production of valves for ordinary passenger automotive use are not too severe, for here the exhaust valve rarely operates at temperatures above 1450° F., the stresses are comparatively low, and little corrosion and scaling will occur. A drastically different situation is encountered in the case of engines of high power output, such as those used in trucks, buses, tractors and the like. For here the valves operate at temperatures as high as 1600° F., with correspondingly high temperatures encountered in the region of the exhaust valves. Scaling and corroding action under these high temperatures and heavy duty conditions are greatly accelerated.

A series of alloys consisting largely of cobalt, chromium and tungsten, or molybdenum, as a group known as Stellites, have been found to be highly effective in resisting the scaling and corrosion action under high temperature corrosive atmospheric conditions encountered in heavy duty internal combustion engines. Moreover, they display a high degree of hardness when subjected to elevated temperatures thus giving long wear.

Unfortunately, however, Stellite is a very expensive metal. From an economic standpoint therefore, its use as a sole source of valve material is prohibited. Moreover, other characteristics of Stellite such as its lack of ready formability render it unsuitable for use as a source material out of which to fabricate the entire valve. Therefore the valve itself is fashioned of some less expensive low alloy metal and then, at the critical point where severe operating conditions are encountered, there is provided a facing of Stellite or such other high alloy metal as desired. And this has been done in many instances, with results which have been entirely satisfactory when working with the comparatively low alloy stainless steels employed as base stock, to which the Stellite or other highly resistant alloys are applied, as by welding.

Now, in the application of these Stellite or other faces to the alloy metal from which the valve or similar article is formed, it frequently has been necessary to flux the valve and to then apply the metal directly thereto. The flux to which we have referred was employed, partly to shield the heated surface of the metal, but mainly to combine with the oxide scale or slag which forms on the surface of the metal, the flux altering the properties of this slag so that the welding operation would not be hindered.

When the higher alloy steels are employed as base stock, however, possessing increased chromium content, and particularly where other alloy ingredients are included in substantial amount such as manganese, the fluxes heretofore successfully employed no longer prove satisfactory. This detrimental phenomenon long has served sorely to perplex the art.

Moreover, and consistent with modern-day manufacture, and to minimize operating costs, the practice has arisen of undertaking high speed fusion-welding of these products on welding machines, themselves of high speed, and which are either entirely automatic or semi-automatic in operation. Following this practice, automatic operation required proper shielding of the metal, since no opportunity for correction is afforded. Illustratively, the roughly formed valves or similar products are placed on the machine at proper stations, the metal is fluxed, and the welding torch or torches applied, along with the welding metal. This weld metal, such as Stellite or the like is best applied at such times as the base metal has been brought to a proper welding temperature. And this temperature is best determined when the metal of the valve or the like begins to "sweat." Upon observing this condition, the operator from experience knows that the metal is hot enough for the successful application of the Stellite or other high alloy material to be welded thereon.

Thus, in short, it may be noted that the welding machine holds a group of valves or similar products, and that as this machine is rotated, the valves rotate therewith. This brings them into position beneath welding torches which bring the metal to proper temperature. The Stellite weld metal is melted and applied to the valve. Ordinarily each valve is held in a refractory cup and the Stellite comes from a weld rod in uncoated form.

In following the practice noted we have observed that illustratively, the alloy steels known in the industry as XCR and 21–12 (21% chromium and 12% nickel) at times may be successfully coated without the use of flux. This is possible because the operator can by eye readily perceive when the required condition of "sweating" of the valve stems is reached. Thus, when the operator finds the metal of the valve to be red-hot and at proper welding temperature, then the Stellite can be dropped thereon and a successful bond achieved. And this is because the surface of the valve is at the incipient melting stage. If melting of the surface of the valve is permitted to advance beyond the incipient stage, the molten Stellite or higher alloy material subsequently applied will become objectionably diluted with the lower alloy base metal. And this dilution will detract from the desired properties of the higher alloy coating or facing.

Actually, the formation of a detrimental oxide scale or slag, which would necessitate the use of a flux, is observed most frequently during those welding operations which do not provide good protection of the metal surface from the surrounding atmosphere. Illustratively, while the atomic-hydrogen arc-welding process provides an excellent protective atmosphere of hydrogen, and therefore ordinarily does not require the use of a flux, quite on the contrary in other fusion-welding processes, such as the oxy-acetylene torch welding process, which provides little protection from the atmosphere, oxidation of the metal surface becomes an important problem.

Thus, the steels high in chromium, when used as the base metal in valves and generally similar fabricated articles, almost always require the use of a flux in welding operations, and particularly when subjected to the oxy-acetaylene welding technique. And we find this is largely because the oxide film or slag which forms on the metal surface consists predominately of chromium oxide. For we note that this chromium oxide is a highly viscous, impervious covering of high melting point. The chromium oxide slag, possessing the properties just referred to, seriously impedes effective welding practices following known and conventional techniques, particularly those of the fusion-welding type. Over a period of time, however, the art has been successful in producing fluxing compounds which successfully combat this oxide on the surface of certain of the chromium-containing steels, and such fluxes are now commercially available.

The recent production of steels high in chromium along with substantial additions of manganese, however, and which have been developed particularly with a view towards a high degree of resistance to heat, have interposed important new practical difficulties so far as concerns fusion-welding. Typical of this new class of steels are Armco 21–4 (21% chromium, 10% manganese, 4% nickel), 21–4N (21% chromium, 10% manganese, 4% nickel and .40% nitrogen), and 21–3N (21% chromium, 10% manganese, 3% nickel and .30% nitrogen) stainless steels.

When an attempt was first made to fusion-weld these steels by the accepted oxy-acetylene process, it was found that the known fluxing compounds theretofore developed were not at all satisfactory. Among other defects, they did not properly combat the viscous and tenaciously-clinging, highly refractory oxide slag which forms on the surface of these grades of steel. Welding tests in which we compared the slag-forming characteristics of the austenitic manganese steels, the austenitic chromium-nickel steels, and the austenitic chromium-nickel-manganese steels have conclusively demonstrated that the presence together in the steel of large quantities of chromium and manganese produces an unusually tough, impervious oxide coating on the heated surface. It is found that this film is highly detrimental in the fabrication processes. The film must be avoided in fabrication, or its properties sufficiently altered to enable proper fusion-welding.

An object of our invention, therefore, is to effectively avoid the various difficulties heretofore confronting the art, and at the same time to provide in simple, ready, efficient manner and at low cost, a suitable fluxing material for high temperature operations which will effectively convert the tough, tenacious slag formed in heating the high chromium steels, particularly those including large quantites of manganese, to a slag of more workable characteristics, permitting ready fusion and enabling ready observation of the momentary temperature conditions maintaining in the base metal so that the operator can best determine the exact moment of successful welding. Additionally, an object is to provide a method of welding employing such a flux and to provide the fluxed articles preparatory to welding all achieved in ready, rapid, simple and efficient manner and at minimum cost.

Referring now more particularly to the practice of our invention we employ a liquid flux composition which essentially consists of two important components. The first of these is certain inorganic flux solids. These combine with the objectionable oxide scale or slag and alter its properties to facilitate the welding operation. A second essential component is the flux vehicle. This shields and protects the surface of the metal and binds the flux solids thereto, and this even under the heat and pressure of the oxy-acetylene flame. This shielding and protecting action must endure for a time sufficient to allow the accomplishment of the welding operation. And, of particular importance, the surface coating which results from the combined action of the two components must be quite thin, say of the order of .001 inch in thickness, in order to provide a suitable medium which permits "sweating" or incipient fusion of the surface of the metal and thereby conditions the same for union in the welding process.

The metal articles to be welded, illustratively internal combustion engine exhaust valves in the region to be welded, are dipped in the fluxing solution and are then subjected to a drying and curing step, thereafter being stored, awaiting mounting in the welding machine. During the early phase of this drying operation the flux coating sets as a hard, tenacious film on the surface of the article. Part of the curing step may be included in the storage, awaiting welding, where desired.

From the foregoing it may be surmised that an important and primary problem with us in the practice of our invention is to control the viscosity of the liquid flux and also to give satisfactory bonding action to the metal surface. And adhesion of the solid fraction of the flux to the metal after application is likewise highly important. All this is successfully accomplished in the use of our new flux. As evidence of this, we have observed that our flux will not blast off of the metal surface under the action of the oxy-acetylene torch.

The special flux which we have evolved in satisfying these foregoing requirements possesses a number of features not found in any other known flux. Outstanding among these are first, that it contains inorganic components which will effectively flux the scale or slag which is formed on the surface of the steels which are high in chromium and manganese, and second, that the inorganic components are bound to the steel surface by a binder which remains intact and adherent, and this under the heat and scouring action of the oxy-acetylene flame.

Our new flux consists of a coating compound which readily is applied to the steel surface prior to the welding operation. This is highly important in that the products to be welded can be first conditioned with the flux, and then stored, so that when the time comes to station them in the automatic welding machine, wherein a number of such welding operations are simultaneously carried out, no loss of time is required to condition the valve stems or other similar products for welding. Thus, the welding machine can be used at maximum capacity and efficiency, with full utilization of the investment therein. Our new flux is prepared and used in the form of a sirupy liquid which can be applied to the metal surface in a coating of requisite thinness by dipping, spraying, painting or other usual surface coating techniques.

The inorganic flux solids employed in our flux consist of a mixture of finely divided carbonates, sulphates or phosphates, these being comprised of members of the alkali metal series of chemical elements, all in mixture with silicon dioxide and either with or without the corresponding silicates. Those members of the alkali metal series which are particularly suitable are lithium, sodium and potassium. As well, we have found that successful use may be made of mixtures of the carbonates, sulphates, or phosphates of the alkaline earth series of elements, of which in particular magnesium, calcium, strontium and barium derivatives are typical, these being admixed with silicon dioxide, or the corresponding silicates of the alkali metals or alkaline earth series may be employed with or without silicon dioxide.

In our investigation we found that as the inorganic solid, lithium carbonate when used along with silicon dioxide, i. e., silica, gives especially satisfactory results. On the other hand when powdered metal such as silicon, ferro-silicon, titanium and the like are employed, these prove not to be satisfactory; they form a cake or layer which prevents proper heat transfer to the metal surface. Silicon dioxide alone works moderately well, but gives spotty results, and proves difficult to fuse when used alone. Titanium oxide and barium oxide alone are found to be of little if any value. Compositions including lithium carbonate are found to give best results, especially those melting at moderately low temperatures. We find that for the best results, the flux should melt just below the melting point of the steel on which it is employed and this melting point is principally determined by the relative proportions of the silicon dioxide and the alkali metal or alkaline earths.

The silicon dioxide may be Celite (fine particle size silicon dioxide) with particle size ranging from 325 to 375 mesh, a desirable precaution being that at least 80% of the material passes through a 300 mesh screen. The lithium carbonate preferably is comprised of about the same size particles.

At this point it again should be noted that one purpose of our flux is to improve the flow qualities of the refractory oxides as they are formed on the surface of the high alloy steels as they undergo heating. This is achieved by a lowering of their melting points, and flowing them across the surface of the metal but yet permit inspection of the surface, and determination as to when the metal approaches suitable welding temperature. To this end and in the combination of the lithium carbonate with the silicon dioxides we find that a mixture of three parts of lithium carbonate to one part of silicon dioxide by weight give fair properties while a mixture of two parts of lithium carbonate with one part of silicon dioxide by weight, produces excellent results. Finally, a mixture of one part of lithium carbonate with two parts of silicon dioxide by weight we find gives rise to only poor results.

As we have stated, the flux solids are carried in a suitable vehicle. And the proper selection of this vehicle in itself is of material importance. Typically, this comprises a resin which is highly resistant to heat and which displays highly tenacious adherence to the metal surface. Preferably this vehicle is of the silicone, alkyd-modified silicone, or other modified silicone variety. It is combined with small quantities of suitable organo-metallic curing catalysts, and is dissolved in the proper combination of solvents to promote the surface coating technique desired. Any one, or a combination, of a variety of silicone or modified-silicone resins may be employed, selected from the class of partially polymerized resinous products which are commercially available, and which have been especially designed for surface coating applications.

For successful practice one essential must be observed, that the particular resinous polymer which is chosen is amenable to further curing and hardening to provide sufficient adhesion to the surface of the metal with assurance that, when so positioned, it thereupon displays requisite resistance to heat. To obtain this required heat resistance to the oxy-acetylene flame used in the fusion-welding processes, we find that the resinous polymer chosen must contain not less than approximately 5% by weight of true silicone resin.

Silicone resin modifying agents which may be successfully used in admixture with the true silicone include unsaturated fatty acids, phthalic anhydride and other alkyd resins, phenol-formaldehyde, urea-formaldehyde, melamine, and melamine-formaldehyde resins. The choice of the proper solvent combination must be such that the combination will foster the surface coating technique desired and at the same time produce a thin, uniform distribution of the inorganic flux solids and resins over the metal surface to be welded. For example, a mixture of xylene, methyl-ethyl ketone, and trichlorethylene may be used in dip-coating applications. So employed, we find that the flux solids are highly dispersed and suspended in the flux vehicle.

Some further discussion is required of the proper relation between the true silicone resin and the modified-silicone resin, a mixture of which we employ in our new liquid flux. The amount of silicone needed is entirely dependent upon the nature of the modifying resin, oil or other resin constituent which we employ. Now, by way of illustration, if the silicone be modified with a material which itself displays high resistance to heat, of which melamine-formaldehyde is typical, then only a relatively small quantity, perhaps as small as 5% by weight of a true silicone is required. On the other hand, should the true silicone be modified with a material which is intrinsically low in resistance to heat, illustratively unsaturated fatty acids, then to compensate therefor a much larger amount of true silicone, perhaps up to 30% by weight, is required. It should be clear that with the proper balance of the silicone to modifying resin ratio, and with proper consideration of the specific type of silicone and modifying material used, then many different combinations having equivalent adhesion, curing rate, heat resistance and other properties needed in the flux are possible, all falling within the scope of our disclosure.

A second point worthy of further clarification is the fact that the basic purpose of modifying the silicone resin is not so much to dilute or to adulterate it but rather to modify the basic silicone resin, the presence of which is essential for obtaining the requisite high resistance to heat, with other materials in order to secure rapid curing and diminished drying time, and to secure high initial adhesion of the flux to bright, finished metal surfaces.

Expressed in other words, while the true silicone resin inherently possesses requisite high resistance to the heat, it does not display required rapid curing and rapid and high initial adherence to the bright metal surfaces undergoing fluxing. On the other hand, it is the modified silicones which possess these two latter qualities, while falling short of the required high resistance to the heat. A combination of these factors is achieved through the proper and intelligent admixture of the true silicone resin with the several possible modifiers. Thus, 100% silicone resins do not generally have the ability to properly wet bright finished metal surfaces, and they require relatively long exposure at elevated temperatures for curing. When properly modified, however, the curing rate is radically reduced, and initial adherence is achieved to the bright metal surfaces while retaining requisite high resistance to elevated temperatures.

Now, to carry into effect the foregoing generalization, we have found that the flux composition to be applied to the work shall consist largely as follows, the figures being by weight:

1. Approximately 5% to 40% of the inorganic flux solids previously specified.
2. Approximately 5% to 40% silicone or modified silicone resin.
3. The remainder essentially all organic solvent, with the limitation that the solvent content of the entire composition be approximately 20% to 90%.

A specific, detailed example of the liquid flux coating composition designed especially for welding of automotive exhaust valve faces formed of Armco 21–4, 21–4N and 21–3N stainless steel, and giving entirely satisfactory results is set forth in the following table, all proportions being by weight:

*Table I*

| | Weight percent |
|---|---|
| Lithium carbonate (Baker's C. P. anhydrous powder) | 6.90 |
| Silicon dioxide (Johns-Manville Celite No. 281) | 5.60 |
| Silicone resin (Dow-Corning XR-643. 50% in xylene) | 25.00 |
| Methyl-ethyl ketone (technical) | 20.00 |
| 8% zinc naphthenate (Nuodex) | 0.60 |
| 4% calcium naphthenate (Nuodex) | 0.40 |
| Trichlorethylene (technical) | 41.50 |
| Total | 100.00 |

Regardless of the surface coating technique desired, and without reference to the resulting specific liquid flux compound chosen, it is essential that the dried flux film which results on the surface of the metal to be welded consists of approximately 30% to 70% by weight of the inorganic flux solids previously specified, and that the remainder be essentially all silicone or modified-silicone resin, the proportions of which are consistent with the teachings hereinbefore set forth.

As illustrative of the application of the foregoing teachings, we have welded a number of sample automotive exhaust valves of Armco 21–4N stainless steel, applying thereto a coating using a liquid flux comprised of approximately 15% by weight of a mole-to-mole mixture of lithium carbonate and silicone dioxide, these being suspended in a vehicle consisting of a modified silicone resin dissolved in xylene, methyl-ethyl ketone and trichlorethylene. The exhaust valves were dipped into the coating compounds and permitted to dry or cure in the air. Two days later these valves were subjected to a welding operation wherein a rotating turn-table was employed for the valve stems, subjecting the same to a multi-flame, oxy-acetylene gas torch. When these flux-coated valves were heated by this equipment, the valve face "sweated" properly and fused in a manner satisfactory for welding.

Carrying these experiments further, a number of valves of the same steel formula were single-dip-coated with the specific liquid flux composition just described under Table I. And thirteen days later, after coating, these valves bearing the cured flux film were subjected to actual production conditions encountered in the use of semi-automatic oxyacetylene welding machines. Certain of the valves were employed to adjust the welding machine and familiarize the operator with the welding technique. The remaining valves, comprising approximately three-fourths of all of the valves treated, were successfully welded under production conditions. The resulting weld was subjected to visual, microscopic and Xyglo examination, and displayed no evidence of porosity nor excessive dilution of weld metal. The thickness of the weld metal was found to be highly adequate, and the weld itself was proved eminently satisfactory and sound.

Accordingly, following the practice of our invention there is produced a flux which can be readily and exactly proportioned as to its ingredients to conform almost precisely with the requirements of any fusion-welding operation, be the same manual or through the use of automatic or semi-automatic welding machines, and involving the application of alloying metals to prepared surfaces of austenitic or other steels of high chromium and manganese content. Our new flux involves a minimum complexity of preparation, requiring only a limited number of manipulative and procedural steps, with minimum plant and equipment, and involving comparatively inexpensive ingredients which are readily available in the market.

The flux composition holds the essential elements thereof in highly dispersed, uniform distribution and is capable of ready application as a thin, uniform film across the prepared surface of the metal products to be welded. Physically tenacious and displaying a high resistance to heat, and having a controlled melting point just slightly below the temperature of incipient fusion of the metal undergoing welding, our flux has a controlled and nicely determinable rate of drying and curing. Accordingly, it is possible to apply the flux to the article to be welded at the conclusion of its final preliminary fabrication stage in a thin, dry and adhesive coating, whereupon the fabricated articles, thus prepared for welding, may be stored until it is desired to carry out the actual welding operation. And without sacrifice of time, this period of storage may be effectively employed for drying and curing the thin coating of flux on the product to be welded.

In actual operation and upon the application of a welding torch to the coated metal surface, the flux effectively transforms the characteristics of the refractory chromium oxide slag causing the same to flow with adequate freedom and enabling the operator to observe when the metal surface begins to "sweat," thereby indicating that welding temperature has been reached. It remains tightly adherent to the metal in the region of the weld and cannot readily be displaced by the blast of the welding torches.

The method of preparing the flux and coating the same upon the fabricated articles is in itself simple, direct, satisfactory and of low cost, while the fluxed articles may conveniently be stock-piled for subsequent welding without fear of damage in storage.

It is apparent from a consideration of the foregoing that once the broad aspects of our invention are disclosed many embodiments will readily occur to those skilled in the art. Accordingly, we intend the foregoing disclosure to be considered solely as illustrative, and in no sense a limitation.

We claim:

1. A flux for high alloy stainless steels comprising 5% to 40% by weight of solid, essentially consisting of material selected from the group consisting of finely divided carbonates, sulphates and phosphates of members of the alkali metal series and alkaline earth series, and material selected from the group consisting of silicon dioxide and of the silicates of the alkali metals and alkaline earths; 5% to 40% by weight of a combination of true silicone and modified silicone resins, the true silicone resin amounting to said 5% at least; and remainder organic solvent.

2. A liquid fluxing composition for stainless steels high in chromium and manganese contents comprising 5% to 40% by weight of finely divided inorganic solids essentially consisting of material selected from the group consisting of finely divided carbonates, sulphates and phosphates of members of the alkali metal series and alkaline earth series and material selected from the group consisting of silicon dioxide and the silicates of the alkali metal series and alkaline earth series; said inorganic solids being widely and uniformly dispersed in 5% to 40% by weight of vehicle consisting of true silicone and alkyd-modified silicone resins together with a small amount of organo-metallic curing catalysts, said true silicone resin amounting to said 5% at least; and said vehicle and solid being dissolved in 20% to 90% by weight of volatile organic solvent.

3. A liquid fluxing composition for stainless steels of high chromium and manganese contents comprising 5% to 40% by weight of finely divided inorganic solids essentially consisting of material selected from the group consisting of finely divided carbonates, sulphates and phosphates of members of the alkali metal series and alkaline earth series and material selected from the group consisting of silicon dioxide and the silicates of the alkali metals and metal alkaline earths; 5% to 40% by weight of vehicle consisting of true silicone and partially polymerized resinous products which are amenable to further curing and hardening, the said true silicone resin amounting to said 5% at least; and remainder a highly volatile solvent dissolving the said resins.

4. A liquid welding flux composition for stainless steels high in chromium and manganese contents, comprising, in intimate relationship, 5% to 40% by weight of finely divided inorganic solids selected from the group consisting of finely divided carbonates, sulphates and phosphates of members of the alkali metal series and alkaline earth series together with material selected from the group consisting of silicon dioxide and the silicates of the alkali metals and alkaline earths; 5% to 40% by weight of true silicone resin together with a silicone resin modifying agent, the latter selected from the group consisting of unsaturated linseed oil, fatty acids, phthalic anhydride and other alkyd resins, phenol-formaldehyde, urea-formaldehyde, melamine and melamine-formaldehyde resins, the said true silicone resin being not less than said 5% by weight; and remainder a suitable volatile organic solvent for said silicone.

5. A liquid fluxing composition for stainless steels comprising, intimate relationship, 5% to 40% by weight of finely divided inorganic solids selected from the group consisting of finely divided carbonates, sulphates and phosphates of members of the alkali metal series and alkaline earth series together with material selected from the group consisting of silicon dioxide and the silicates of the alkali metals and alkaline earths; 5% to 40% by weight of true silicone resin together with a silicone resin modifying agent, the latter selected from the class consisting of alkyd-modified and other modified silicones; and remainder a solvent for the said resinous composition consisting of an admixture of xylene, methyl-ethyl ketone and trichlorethylene.

6. A liquid fluxing composition for stainless steels of high chromium and manganese contents comprising, in intimate admixture and by weight, approximately 5% to 40% by weight of inorganic flux solids selected from the group consisting of finely divided carbonates, sulphates and phosphates of members of the alkali metal and the alkaline earth series along with material selected from the group consisting of silicon dioxide and the corresponding silicates; approximately 5% to 40% of a vehicle consisting of silicone and modified silicone resins; and the remainder essentially all organic solvent, the solvent content being approximately 20% to 90%.

7. A liquid fluxing composition for stainless steels high in chromium and manganese contents and approximately comprising by weight finely powdered lithium carbonate 6.90%, silicon dioxide 5.60%, silicone resin (50% xylene solution) 25.00%, methylethyl ketone 20.00%, 8% zinc naphthenate 0.60%, 4% calcium naphthenate 0.40%, trichlorethylene 41.50%.

8. A substantially dry fluxing composition for stainless steels high in chromium and manganese contents comprising in intimate relationship, 30% to 70% by weight of finely divided inorganic solids selected from the group consisting of finely divided carbonates, sulphates and phosphates of members of the alkali metal series and alkaline earth series, along with material selected from the group consisting of silicon dioxide and the silicates of the alkali metals and alkaline earths; and remainder a vehicle for said inorganic solids consisting of true silicone resin together with a silicone resin modifying agent, the latter selected from the group consisting of unsaturated linseed oil, fatty acids, phthalic anhydride and other alkyd resins, phenol-formaldehyde, urea-formaldehyde, melamine and melamine-formaldehyde resins, the said vehicle containing not less than approximately 5% by weight of said true silicone resin.

9. The method of preparing for fusion-welding a metal surface comprised of stainless steel high in chromium and manganese contents comprising providing a flux for use in fusion-welding and itself comprising in intimate relationship 5% to 40% by weight of finely divided inorganic solids selected from the group consisting of finely divided carbonates, sulphates and phosphates of members of the alkali metal series and alkaline earth series carried and suspended in widely and uniform dispersal in a 5% to 40% by weight of a vehicle consisting of a true silicone resin together with a silicone resin modifying agent capable of accelerating the rate of drying and the initial adherence of the flux to a metal surface, all in 20% to 90% by weight of volatile solvent; then coating the flux in a thin layer on the metal surface to be welded; and thereafter drying and curing the flux to a hard, adherent film on the metal surface.

10. The method of preparing for subsequent fusion-welding a fabricated article formed of stainless steel high in chromium and manganese contents comprising preparing in viscous solution lithium carbonate along with silicon dioxide, both finely powdered and carried in a silicone resin admixture, along with a volatile organic solvent; providing a thin coating thereof on a metal surface prepared for welding; and then curing the same to a hard adherent coating on the surface of the metal, preparatory to welding.

11. The method of preparing for fusion-welding practices fabricated articles of stainless steels high in chromium and manganese comprising preparing a welding flux, itself comprising 5% to 40% by weight of an inorganic flux solid selected from the group consisting of carbonates, sulphates and phosphates of the alkali metal and alkaline earth series along with material selected from the group silicon dioxide and the silicates of alkali metals and alkaline earths, together with 5% to 40% by weight of silicone resin vehicle and 20% to 90% by weight of organic solvent; dip-coating the fabricated article with a thin coating of said flux; and then air-drying and curing the flux coating in advance of and preparatory to fusion-welding.

12. As a new article of manufacture, a fabricated stainless steel article of high chromium and manganese contents conditioned for subsequent fusion-welding; and a thin coating thereon of 30% to 70% by weight of finely and uniformly dispersed inorganic flux solids selected from the group consisting of carbonates, sulphates and phosphates of the alkali metal and the alkaline earth series along with material selected from the group consisting of silicon dioxide and the corresponding silicates, and bonded by 70% to 30% by weight of silicone resin which holds the flux solids tightly on the metal surface even under high temperature welding conditions.

13. As a new article of manufacture, a fabricated article formed of stainless steel high in both chromium and manganese contents having a prepared surface; and a thin flux coating thereon containing 30% to 70% by weight of 1 to 3 parts finely dispersed lithium carbonates and 1 part silicon dioxide carried in 70% to 30% by weight of silicone resin displaying tenacious adherence to the prepared metal surface under elevated temperatures.

References Cited in the file of this patent

UNITED STATES PATENTS

| Number | Name | Date |
|---|---|---|
| 1,256,429 | Beaulieu | Feb. 12, 1918 |
| 2,248,104 | Marini et al. | July 8, 1941 |
| 2,262,023 | Lytle et al. | Nov. 11, 1941 |
| 2,452,493 | Rollason et al. | Oct. 26, 1948 |
| 2,473,887 | Jennings et al. | June 21, 1949 |
| 2,639,276 | Smith-Johannsen et al. | May 19, 1953 |

OTHER REFERENCES

Paint, Oil and Chemical Review, November 11, 1948, pgs. 49, 50, and 51.